(12) United States Patent
Sand et al.

(10) Patent No.: US 12,665,919 B2
(45) Date of Patent: Jun. 23, 2026

(54) METHOD AND SYSTEM FOR IMPLEMENTING A SERVICE THAT SIMPLIFIES NETWORK CYBER DEFENSE CAPABILITIES

(71) Applicant: JPMorgan Chase Bank, N.A., New York, NY (US)

(72) Inventors: Ankur Sand, Cambridge (GB); Ken Wilson, Millington, NJ (US); Marty Grant, Middletown, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 293 days.

(21) Appl. No.: 18/112,300

(22) Filed: Feb. 21, 2023

(65) Prior Publication Data

US 2024/0283810 A1      Aug. 22, 2024

(51) Int. Cl.
H04L 29/00         (2006.01)
H04L 9/40          (2022.01)
(52) U.S. Cl.
CPC ................................. H04L 63/1433 (2013.01)
(58) Field of Classification Search
CPC ............................ H04L 63/1433; H04L 63/20
See application file for complete search history.

(56) References Cited

U.S. PATENT DOCUMENTS

| | | | | |
|---|---|---|---|---|
| 10,462,176 | B2 * | 10/2019 | Tamir | .................... G06F 21/577 |
| 10,523,695 | B2 * | 12/2019 | Fach | ................... H04L 63/1433 |
| 10,601,856 | B1 * | 3/2020 | Natanzon | .............. G06F 21/563 |
| 11,151,810 | B2 * | 10/2021 | Ryan | ...................... B60K 35/29 |
| 11,290,483 | B1 * | 3/2022 | Kannan | ............... H04L 63/1433 |
| 11,533,332 | B2 * | 12/2022 | Engelberg | ........... H04L 63/1433 |
| 11,558,401 | B1 * | 1/2023 | Vashisht | ............ H04L 63/1416 |
| 11,620,303 | B1 * | 4/2023 | Roy | ...................... G06F 16/313 |
| | | | | 707/736 |
| 11,856,011 | B1 * | 12/2023 | Vashisht | ............. H04L 63/1416 |
| 11,876,833 | B2 * | 1/2024 | Lyle | ................... H04L 47/2441 |
| 2014/0330651 | A1 * | 11/2014 | Klemm | .............. G06Q 30/0269 |
| | | | | 705/14.66 |
| 2018/0309779 | A1 * | 10/2018 | Benyo | ................. H04L 63/1433 |
| 2018/0309794 | A1 * | 10/2018 | Eskridge | ............. H04L 63/1433 |
| 2019/0260784 | A1 * | 8/2019 | Stockdale | ........... H04L 63/1441 |

(Continued)

FOREIGN PATENT DOCUMENTS

| | | | | |
|---|---|---|---|---|
| CN | 111510449 B | * | 12/2020 | ......... G06F 18/2321 |

*Primary Examiner* — Don G Zhao

(74) *Attorney, Agent, or Firm* — Greenblum & Bernstein, P.L.C.

(57)                    ABSTRACT

A method, system, and computer-readable storage medium for implementing a service that simplifies network cyber defense capabilities. The method includes: compiling a resource list of resources that exist within a computer network; compiling a cyber defense list of cyber defense mechanisms that exist within the computer network; evaluating the resources and the cyber defense mechanisms, against any applicable threats or vulnerabilities, to determine whether there are any threats to the computer network or any vulnerabilities to that network; and generating a visual indication of any of the computer network's threats or vulnerabilities. The resource list may include a resource configuration of the resources, and the cyber defense list may include a cyber defense configuration of the cyber defense mechanisms.

16 Claims, 5 Drawing Sheets

400

Compile a Network Resource Configuration List
S402

Compile a Network Cyber Defense Configuration List
S404

Utilize the Network Configuration Lists to Train an AI/ML Model
S406

Utilize the AI/ML Model to Identify Applicable Threats and Vulnerabilities
S408

Utilize the AI/ML Model to Evaluate the Applicable Threats and Vulnerabilities Against the Network Configuration Lists
S410

Utilize the AI/ML Model to Determine How the Threats and Vulnerabilities Apply to the Network
S412

Utilize the AI/ML Model to Recommend Network Configuration Changes that Address Any of the Threats and Vulnerabilities that Apply to the Network
S414

Implement Network Configuration Changes
S416

Receive Feedback on the Implemented Network Configuration Changes
S418

Utilize the Feedback to Update the AI/ML Model
S420

(56)        References Cited

U.S. PATENT DOCUMENTS

| | | | |
|---|---|---|---|
| 2020/0057851 A1* | 2/2020 | Agarwal | G06F 30/20 |
| 2020/0177634 A1* | 6/2020 | Hwang | H04L 63/1433 |
| 2020/0342116 A1* | 10/2020 | Agarwal | G06N 20/00 |
| 2020/0358810 A1* | 11/2020 | Fellows | G06N 20/00 |
| 2022/0210202 A1* | 6/2022 | Crabtree | G06F 16/2477 |
| 2022/0318387 A1* | 10/2022 | Chen | G06N 20/00 |
| 2023/0177165 A1* | 6/2023 | Underwood | G06F 21/577 |
| | | | 726/25 |
| 2023/0179621 A1* | 6/2023 | Underwood | H04L 41/22 |
| | | | 726/22 |
| 2023/0179622 A1* | 6/2023 | Underwood | H04L 63/1433 |
| | | | 726/25 |
| 2023/0300161 A1* | 9/2023 | Jenks | H04L 63/1433 |
| 2024/0056486 A1* | 2/2024 | Lowenhardt | H04L 41/16 |
| 2024/0070261 A1* | 2/2024 | Bin Huraib | G06F 21/566 |
| 2024/0080344 A1* | 3/2024 | Francesco | H04L 63/1416 |
| 2024/0106847 A1* | 3/2024 | Yadav | H04L 63/1433 |
| 2024/0223578 A1* | 7/2024 | McNelly | H04L 63/1416 |
| 2024/0275817 A1* | 8/2024 | Grout | H04L 63/1425 |
| 2024/0283810 A1* | 8/2024 | Sand | H04L 63/20 |

* cited by examiner

100

102

| Processor 104 Instructions | Memory 106 Instructions | Display 108 | Input Device(s) 110 | Medium Reader 112 Instructions | Network Interface 114 | Output Device(s) 116 |

Bus 118

Network 122

120

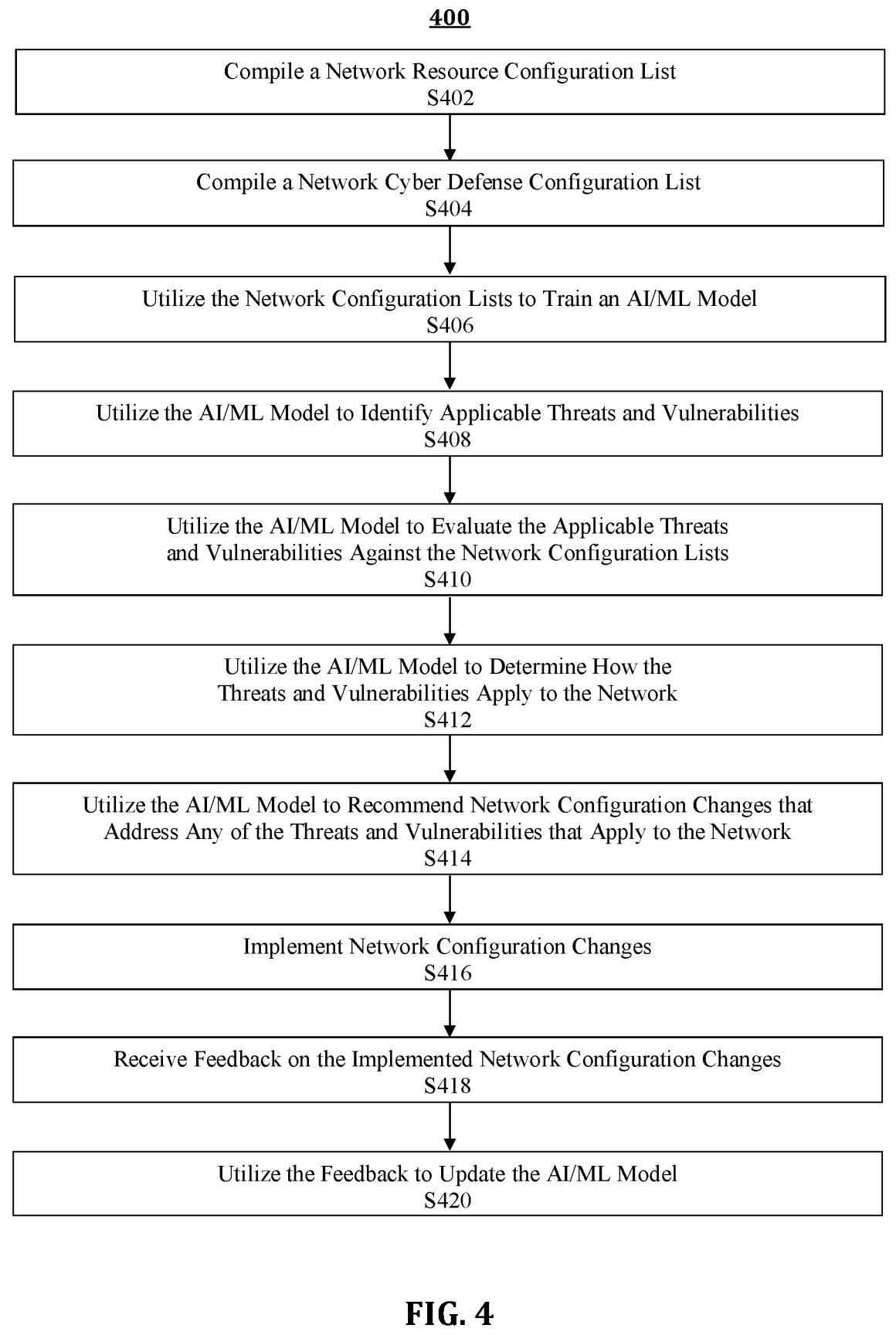

400

Compile a Network Resource Configuration List
S402

Compile a Network Cyber Defense Configuration List
S404

Utilize the Network Configuration Lists to Train an AI/ML Model
S406

Utilize the AI/ML Model to Identify Applicable Threats and Vulnerabilities
S408

Utilize the AI/ML Model to Evaluate the Applicable Threats
and Vulnerabilities Against the Network Configuration Lists
S410

Utilize the AI/ML Model to Determine How the
Threats and Vulnerabilities Apply to the Network
S412

Utilize the AI/ML Model to Recommend Network Configuration Changes that
Address Any of the Threats and Vulnerabilities that Apply to the Network
S414

Implement Network Configuration Changes
S416

Receive Feedback on the Implemented Network Configuration Changes
S418

Utilize the Feedback to Update the AI/ML Model
S420

FIG. 4

METHOD AND SYSTEM FOR IMPLEMENTING A SERVICE THAT SIMPLIFIES NETWORK CYBER DEFENSE CAPABILITIES

BACKGROUND

1. Field of the Invention

The field of the invention disclosed herein generally relates to a system for implementing a service that simplifies an understanding of a computer network's cyber defense capabilities and, more particularly, to a method, system, and computer-readable storage medium for implementing a service that helps security professionals understand the strength and applicability of various defense mechanisms while assessing any adversary tactics, techniques, and procedures (TTPs) or particular cyber threats and vulnerabilities.

2. Background of the Invention

Currently there is a lack of established methods which can help security professionals to understand the strength/applicability of various defense while assessing any adversary tactics, techniques, and procedures (TTPs) or particular cyber threats and vulnerabilities.

Conventional network cyber defense systems are complex because they consist of many parts. Indeed, the many parts of a network cyber defense system are required to protect the computer network against many various cyber threats and vulnerabilities. For example, conventional network cyber defense systems typically required to inspect hundreds of queries per second. Therefore, it is needless to say that it is difficult to understand the underlying framework of all the many various components in the cyber defense systems of a typical computer network.

This difficulty in understanding the inner workings of a cyber defense system can be classified into the following three (3) categories: defense visualization; defense effectiveness; and defense coverage. Regarding defense visualization, there are no effective visualization methods (from cyber adversaries to the vulnerable assets) available in the industry that successfully demonstrate the presence of various Defenses. Regarding defense effectiveness, there are no effective methods (from cyber adversaries to the vulnerable assets) available in the industry that successfully measure the effectiveness of various defenses. Regarding defense coverage, there are no effective methods (from cyber adversaries to the vulnerable assets) available in the industry that successfully pinpoint the lack of current Defenses.

Additionally, the difficulty in understanding the inner workings of a cyber defense system may affect various entities in various ways. For example, for organizations, being unable to effectively assess the strength and applicability of various defense mechanisms while assessing any adversary tactics, techniques, and procedures (TTPs) or particular cyber threats and vulnerabilities may ultimately lead to incorrect assessments of the organization's exposure to cyber risks, which may unintentionally expose the organization to unwanted risks.

As another example, for cyber security professionals, being unable to effectively determine whether multiple deployed defenses (in the form of management, operational, and technical defenses, which identify and eliminate cyber threats at various levels) are working as expected or not (e.g., when any Zero day vulnerability is released or a new attack techniques is discovered or exploited in the wild) may lead cyber security professionals struggling to determine (evidence driven) whether their current defense mechanisms provide the defense coverage necessary to protect their network(s).

As a result, there is a need for a technological mechanism that addresses the previously mentioned difficulties in the field of cyber security by providing cyber security professionals with a means for simplifying and understanding the strength and applicability of various defense mechanisms while assessing any adversary tactics, techniques, and procedures (TTPs) or particular cyber threats and vulnerabilities.

SUMMARY

The present disclosure, through one or more of its various aspects, embodiments, and/or specific features or sub-component, provides, inter alia, various systems, servers, devices, methods, media, programs and platforms for a cyber defense capability assessment tool that improves the overall speed, ease, and user experience of cyber defense capability assessment tasks.

According to an aspect of the present disclosure, a method is provided for implementing a service that simplifies network cyber defense capabilities. The method may comprise: compiling, by a processor, a resource list of resources that exist within a computer network; compiling, by the processor, a cyber defense list of cyber defense mechanisms that exist within the computer network; evaluating, by the processor, the resources and the cyber defense mechanisms, against at least one from among applicable threats and applicable vulnerabilities, to determine whether there exists at least one from among at least one threat to the computer network and at least one vulnerability of the computer network; and generating, by the processor, a visual indication of the at least one from among the at least one threat and the at least one vulnerability. The resource list may comprise a resource configuration of the resources, and the cyber defense list may comprise a cyber defense configuration of the cyber defense mechanisms.

In the method, the visual indication may be provided to at least one individual for analysis, and the visual indication may comprise a defense ranking parameter that summarizes an overall performance of the cyber defense mechanisms with respect to the at least one from among the at least one threat and the at least one vulnerability.

In the method, the visual indication may be provided to at least one individual for analysis, and the visual indication may comprise an illustration of the computer network, and the illustration may depict a performance of at least one of the cyber defense mechanisms with respect to the at least one from among the at least one threat and the at least one vulnerability.

In the method, the resources may comprise at least one from among a client, a server, a gateway, a database, an application, an operating system, an IoT device, a router, a network hub, a network switch, a surveillance camera, a surveillance video recorder, a smart card, a biometric authentication device, an electronic lock, and an access control system; and the cyber defense mechanisms may comprise at least one from among: an antivirus service, a malware scanner, a spam filter, a firewall, an access control mechanism, sandboxing software, an encryption mechanism, an intrusion detection system (IDS), a denial-of-service (DoS) attack monitoring system, and best practices for security.

In the method, the processor may utilize a curated repository to identify the at least one from among the applicable threats and the applicable vulnerabilities, and the curated repository may comprise at least one from among: a Cyber Kill Chain framework; and a MITRE Adversarial Tactics, Techniques, and Common Knowledge (ATT&CK) framework.

In the method, when, as a result of the evaluating, a determination is made that there is at least one from among the at least one threat and the at least one vulnerability, the method may further comprise: recommending at least one configuration change that addresses the at least one from among the at least one threat and the at least one vulnerability.

The method may further comprise: implementing the at least one configuration change; continuously monitoring the computer network to obtain feedback about the implementing the at least one configuration change, wherein the feedback comprises a feedback indication of how the implementing the at least one configuration change affects the at least one from among the at least one threat and the at least one vulnerability; and updating an artificial intelligence and machine learning (AI/ML) model according to the feedback.

In the method, the processor may utilize an artificial intelligence and machine learning (AI/ML) engine to perform the evaluating, and the evaluating may comprise predicting whether there is a risk to which the computer network will be susceptible.

In the method, the evaluating may comprise: receiving training data; training an AI/ML model according to the training data; and utilizing the AI/ML model to determine whether there are at least one from among the at least one threat and the at least one vulnerability. The training data may comprise at least one from among: the resource configuration, the cyber defense configuration, and feedback about the computer network.

According to another aspect of the present disclosure, a system is provided for implementing a service that simplifies network cyber defense capabilities. The system comprises: a processor; and memory storing instructions. When executed by the processor, the instructions cause the processor to: compile a resource list of resources that exist within a computer network; compile a cyber defense list of cyber defense mechanisms that exist within the computer network; evaluate the resources and the cyber defense mechanisms against, at least one from among applicable threats and applicable vulnerabilities, to determine whether there exists at least one from among at least one threat to the computer network and at least one vulnerability of the computer network; and generate a visual indication of the at least one from among the at least one threat and the at least one vulnerability. The resource list may comprise a resource configuration of the resources, and the cyber defense list may comprise a cyber defense configuration of the cyber defense mechanisms.

In the system, the visual indication may be provided to at least one individual for analysis, and the visual indication may comprise a defense ranking parameter that summarizes an overall performance of the cyber defense mechanisms with respect to the at least one from among the at least one threat and the at least one vulnerability.

In the system, the visual indication may be provided to at least one individual for analysis, and the visual indication may comprise an illustration of the computer network, and the illustration may depict a performance of at least one of the cyber defense mechanisms with respect to the at least one from among the at least one threat and the at least one vulnerability.

In the system, the resources may comprise at least one from among a client, a server, a gateway, a database, an application, an operating system, an IoT device, a router, a network hub, a network switch, a surveillance camera, a surveillance video recorder, a smart card, a biometric authentication device, an electronic lock, and an access control system; and the cyber defense mechanisms may comprise at least one from among an antivirus service, a malware scanner, a spam filter, a firewall, an access control mechanism, sandboxing software, an encryption mechanism, an intrusion detection system (IDS), a denial-of-service (DoS) attack monitoring system, and best practices for security.

In the system, when executed by the processor, the instructions may further cause the processor to utilize a curated repository to identify the at least one from among the applicable threats and the applicable vulnerabilities, and the curated repository may comprise at least one from among: a Cyber Kill Chain framework; and a MITRE Adversarial Tactics, Techniques, and Common Knowledge (ATT&CK) framework.

In the system, when executed by the processor, the instructions may further cause the processor to: when, as a result of the evaluation, a determination is made that there is at least one from among the at least one threat and the at least one vulnerability, recommend at least one configuration change that addresses the at least one from among the at least one threat and the at least one vulnerability.

In the system, when executed by the processor, the instructions may further cause the processor to: implement the at least one configuration change; continuously monitor the computer network to obtain feedback about the implementing the at least one configuration change, wherein the feedback comprises a feedback indication of how implementation of the at least one configuration change affects the at least one from among the at least one threat and the at least one vulnerability; and update an artificial intelligence and machine learning (AI/ML) model according to the feedback.

In the system, when executed by the processor, the instructions may further cause the processor to utilize an artificial intelligence and machine learning (AI/ML) engine to perform the evaluation, and the evaluation may comprise predicting whether there is a risk to which the computer network will be susceptible.

In the system, the evaluation may comprise: receiving training data; training an AI/ML model according to the training data; and utilizing the AI/ML model to determine whether there are at least one from among the at least one threat and the at least one vulnerability. The training data may comprise at least one from among: the resource configuration, the cyber defense configuration, and feedback about the computer network.

According to yet a further aspect of the present disclosure, a non-transitory computer-readable medium storing executable instructions is provided for implementing a service that simplifies network cyber defense capabilities. The instructions, when executed by a processor, may cause the processor to: compile a resource list of resources that exist within a computer network; compile a cyber defense list of cyber defense mechanisms that exist within the computer network; evaluate the resources and the cyber defense mechanisms against at least one from among applicable threats and applicable vulnerabilities, to determine whether there exists at least one from among at least one threat to the computer network and at least one vulnerability of the computer network; and generate a visual indication of the at least one from among the at least one threat and the at least one vulnerability. The resource list may comprise a resource configuration of the resources, and the cyber defense list may comprise a cyber defense configuration of the cyber defense mechanisms.

In the computer-readable medium, the visual indication may be provided to at least one individual for analysis, and the visual indication may comprise a defense ranking parameter that summarizes an overall performance of the cyber defense mechanisms with respect to the at least one from among the at least one threat and the at least one vulnerability.

In the computer-readable medium, the visual indication may be provided to at least one individual for analysis, and the visual indication may comprise an illustration of the computer network, and wherein the illustration depicts a performance of at least one of the cyber defense mechanisms with respect to the at least one from among the at least one threat and the at least one vulnerability.

In the computer-readable medium, the resources may comprise at least one from among a client, a server, a gateway, a database, an application, an operating system, an IoT device, a router, a network hub, a network switch, a surveillance camera, a surveillance video recorder, a smart card, a biometric authentication device, an electronic lock, and an access control system; and the cyber defense mechanisms may comprise at least one from among an antivirus service, a malware scanner, a spam filter, a firewall, an access control mechanism, sandboxing software, an encryption mechanism, an intrusion detection system (IDS), a denial-of-service (DoS) attack monitoring system, and best practices for security.

In the computer-readable medium, when executed by the processor, the instructions may further cause the processor to utilize a curated repository to identify the at least one from among the applicable threats and the applicable vulnerabilities, and the curated repository may comprise at least one from among: a Cyber Kill Chain framework; and a MITRE Adversarial Tactics, Techniques, and Common Knowledge (ATT&CK) framework.

In the computer-readable medium, when executed by the processor, the instructions may further cause the processor to: when, as a result of the evaluation, a determination is made that there is at least one from among the at least one threat and the at least one vulnerability, recommend at least one configuration change that addresses the at least one from among the at least one threat and the at least one vulnerability.

In the computer-readable medium, when executed by the processor, the instructions may further cause the processor to: implement the at least one configuration change; continuously monitor the computer network to obtain feedback about the implementing the at least one configuration change, wherein the feedback comprises a feedback indication of how implementation of the at least one configuration change affects the at least one from among the at least one threat and the at least one vulnerability; and update an artificial intelligence and machine learning (AI/ML) model according to the feedback.

In the computer-readable medium, when executed by the processor, the instructions may further cause the processor to utilize an artificial intelligence and machine learning (AI/ML) engine to perform the evaluation, and the evaluation may comprise predicting whether there is a risk to which the computer network will be susceptible.

In the computer-readable medium, the evaluation may comprise: receiving training data; training an AI/ML model according to the training data; and utilizing the AI/ML model to determine whether there are at least one from among the at least one threat and the at least one vulnerability. The training data may comprise at least one from among: the resource configuration, the cyber defense configuration, and feedback about the computer network.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a service that simplifies network cyber defense capabilities.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable storage media having instructions stored thereon for one or more aspects of the present technology as described and illustrated by way of the examples herein. In some examples, the instructions include executable code that, when executed by one or more processors, cause the processors to carry out steps necessary to implement the methods of the examples of this technology that are described and illustrated herein.

Figure 1:
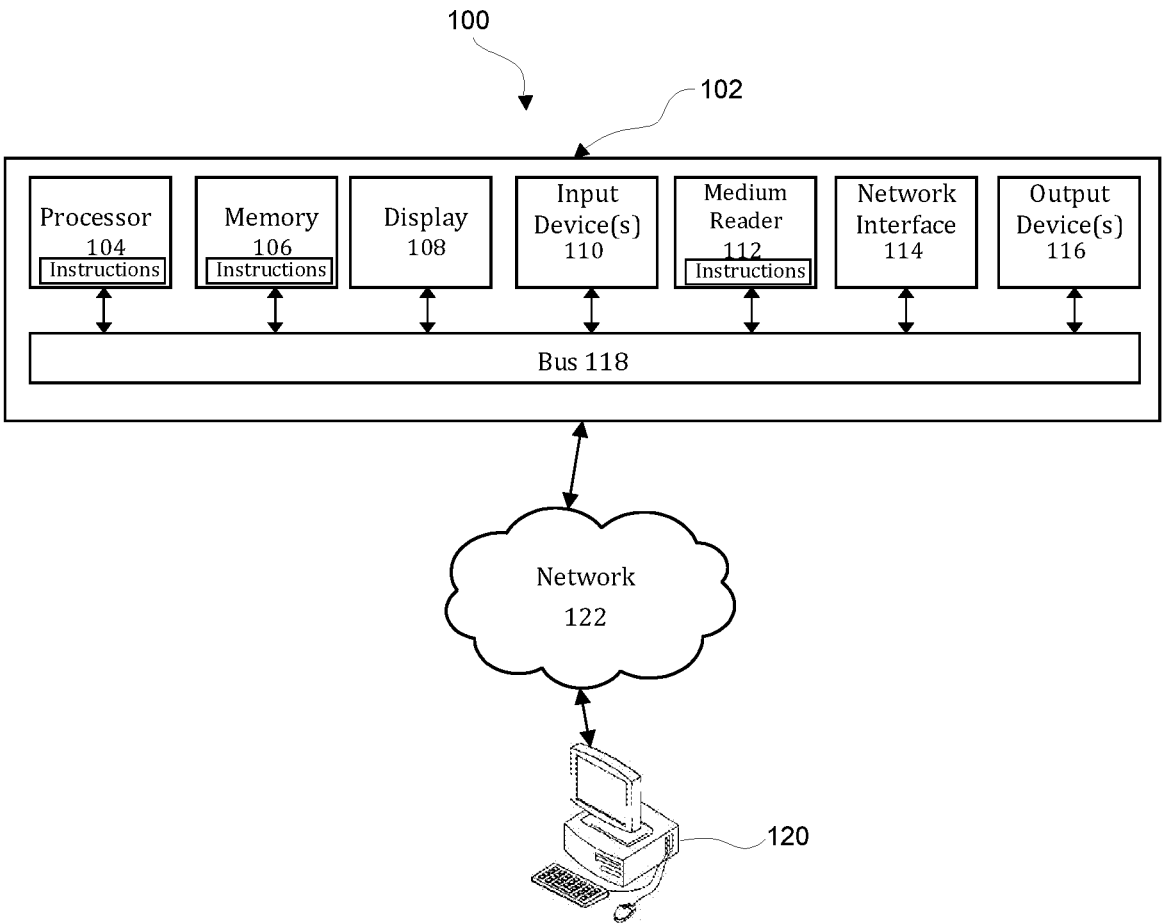
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for implementing a cyber defense capability assessment tool that improves the overall speed, ease, and user experience of cyber defense capability assessment tasks.

Figure 2:
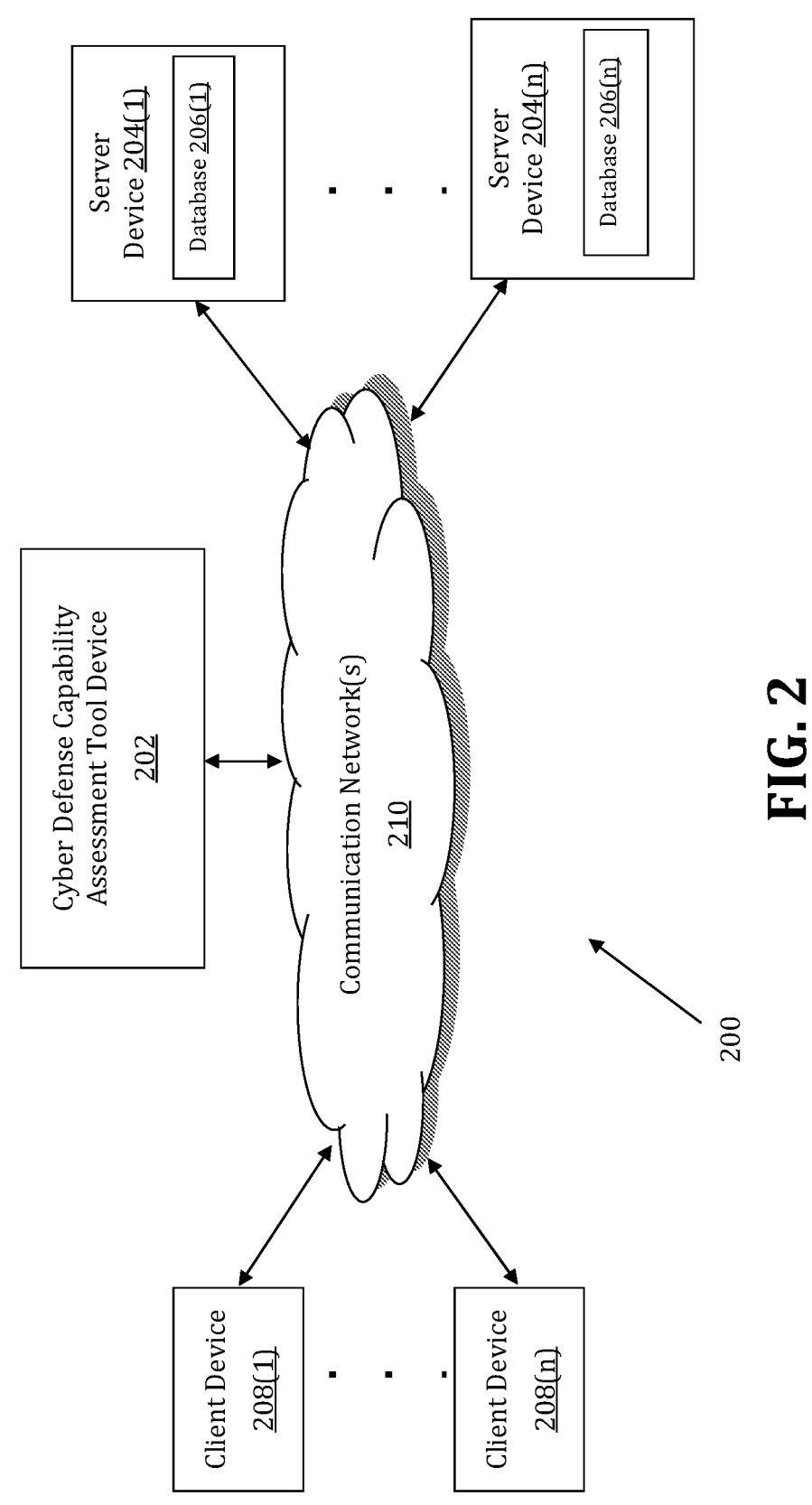
FIG. 2 illustrates an exemplary diagram of a network environment.

Referring to FIG. 2, a schematic of an exemplary network environment 200 for implementing a cyber defense capability assessment tool that improves the overall speed, ease, and user experience of cyber defense capability assessment tasks, is illustrated. In an exemplary embodiment, the method is executable on any networked computer platform, such as, for example, a personal computer (PC).

The method for implementing a cyber defense capability assessment tool may be implemented by a Cyber Defense Capability Assessment Tool (CDCAT) device 202. The CDCAT device 202 may be the same or similar to the computer system 102 as described with respect to FIG. 1. The CDCAT device 202 may be a rack-mounted server in a datacenter, an embedded microcontroller (MCU) in an electronic device, or another type of headless system, which is a computer system or device that is configured to operate without a monitor, keyboard and mouse. The CDCAT device 202 may store one or more applications that can include executable instructions that, when executed by the CDCAT device 202, cause the CDCAT device 202 to perform actions, such as to transmit, receive, or otherwise process network communications, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CDCAT device 202 itself, may be located in virtual server(s) running in a cloud-based computing environment rather than being tied to one or more specific physical network computing devices. Also, the application(s) may be running in one or more virtual machines (VMs) executing on the CDCAT device 202. Additionally, in one or more embodiments of this technology, virtual machine(s) running on the CDCAT device 202 may be managed or supervised by a hypervisor.

In the network environment 200 of FIG. 2, the CDCAT device 202 is coupled to a plurality of server devices 204(1)-204(n) that hosts a plurality of databases 206(1)-206(n), and also to a plurality of client devices 208(1)-208(n) via communication network(s) 210. A communication interface of the CDCAT device 202, such as the network interface 114 of the computer system 102 of FIG. 1, operatively couples and communicates between the CDCAT device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CDCAT device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, computer readable media, and CDCAT devices that efficiently implement a method for a cyber defense capability assessment tool that improves the overall speed, ease, and user experience of cyber defense capability assessment tasks.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CDCAT device 202 may be a standalone device or integrated with one or more other devices or apparatuses, such as one or more of the server devices 204(1)-204(n), for example. In one particular example, the CDCAT device 202 may include or be hosted by one of the server devices 204(1)-204(n), and other arrangements are also possible. As another example, the CDCAT device 202 may be integrated with one or more other devices or apparatuses, such as one or more of the client devices 208(1)-208(n). Moreover, one or more of the devices of the CDCAT device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the CDCAT device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206 (n) that are configured to store data that relates to an network configurations database and a network threat and vulnerability data repository.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(n) in this example may include any type of computing device that can interact with the CDCAT device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the CDCAT device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the CDCAT device 202, the server devices 204(1)-204(n), the databases 206(1)-206(n), the client devices 208(1)-208 (n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CDCAT device 202, the server devices 204(1)-204(n), the databases 206(1)-206(n), or the client devices 208(1)-208(n), for example, may be configured to operate as virtual instances on the same physical machine. In other words, one or more of the CDCAT device 202, the server devices 204(1)-204(n), the databases 206(1)-206(n), or the client devices 208(1)-208(n) may operate on the same physical device rather than as separate devices communicating through communication network(s) 210. Additionally, there may be more or fewer CDCAT devices 202, server devices 204(1)-204(n), databases 206(1)-206(n), or client devices 208(1)-208(n) than illustrated in FIG. 2.

In addition, two or more computing systems, databases or devices may be substituted for any one of the systems, databases or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
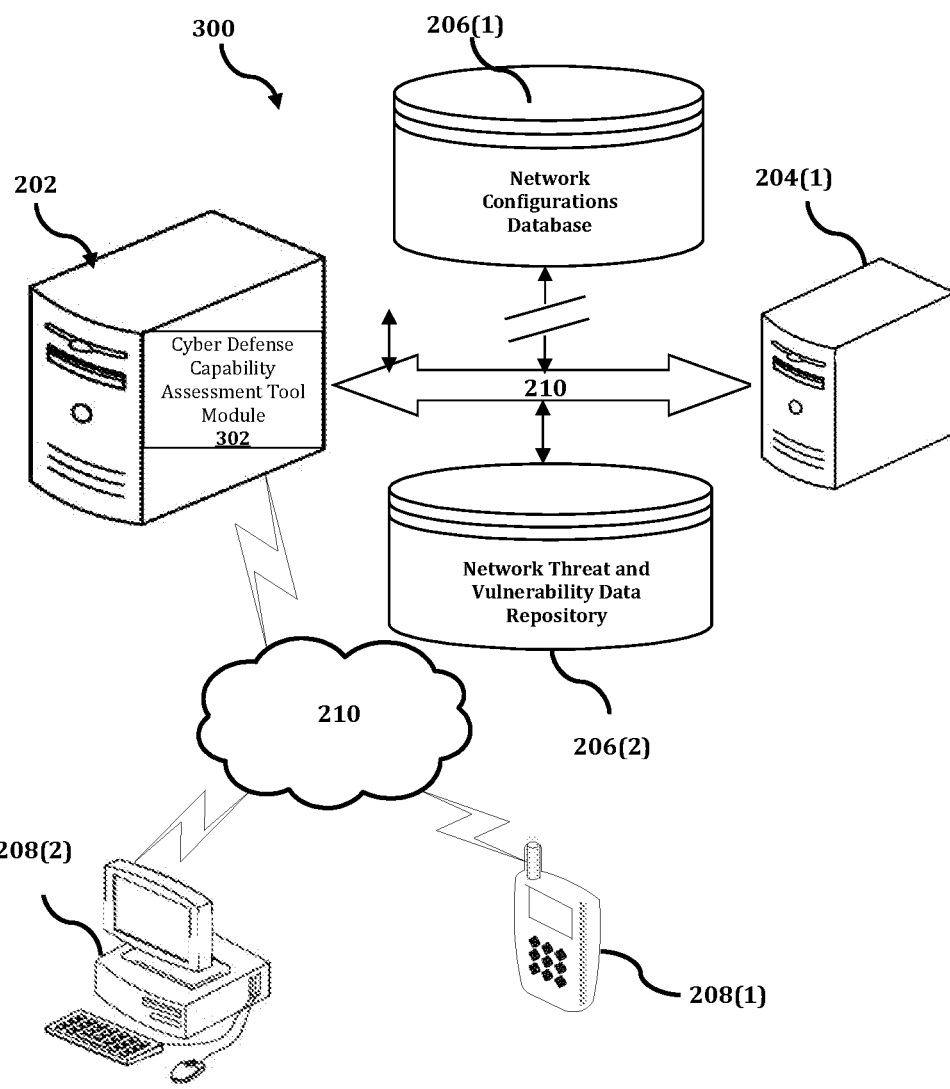
FIG. 3 shows an exemplary system for implementing a service that simplifies network cyber defense capabilities.

The CDCAT device 202 is described and illustrated in FIG. 3 as including cyber defense capability assessment tool module 302, although it may include other rules, policies, modules, databases, or applications, for example. As will be described below, cyber defense capability assessment tool module 302 is configured to implement a method implementing a cyber defense capability assessment tool that improves the overall speed, ease, and user experience of cyber defense capability assessment tasks. Cyber defense capability assessment tool module 302 may include software that is based on a microservices architecture.

Cyber defense capability assessment tool module 302 may be integrated with one or more devices or apparatuses, such as client devices 208(1)-208(n), where cyber defense capability assessment tool module 302 may be implemented as an application or as an addon or plugin to another application of the one or more devices or apparatuses, and where cyber defense capability assessment tool module 302 may execute in the background.

An exemplary process 300 for implementing a cyber defense capability assessment tool by utilizing the network environment of FIG. 2 is illustrated as being executed in FIG. 3. Specifically, a first client device 208(1) and a second client device 208(2) are illustrated as being in communication with CDCAT device 202. In this regard, the first client device 208(1) and the second client device 208(2) may be "clients" of the CDCAT device 202 and are described herein as such. Nevertheless, it is to be known and understood that the first client device 208(1) and/or the second client device 208(2) need not necessarily be "clients" of the CDCAT device 202, or any entity described in association therewith herein. Any additional or alternative relationship may exist between either or both of the first client device 208(1) and the second client device 208(2) and the CDCAT device 202, or no relationship may exist.

Further, CDCAT device 202 is illustrated as being able to access network configuration database 206(1), and network threat and vulnerability data repository 206(2). CDCAT device 202 may comprise cyber defense capability assessment tool that communicates with network configurations database 206(1). In addition, the cyber defense capability assessment tool of CDCAT device 202 may also communicate with network threat and vulnerability data repository 206(2). The cyber defense capability assessment tool module 302 may be configured to access these databases for implementing a cyber defense capability assessment tool that improves the overall speed, ease, and user experience of cyber defense capability assessment tasks.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The client devices 208(1)-208(n) may represent, for example, computer systems of an organization or database network. The first client device 208(1) represent, for example, one or more computer systems of a department or cluster within the organization or database network. Of course, the first client device 208(1) may include one or more of any of the devices described herein. The second client device 208(2) may be, for example, one or more computer systems of another department or cluster within the organization or database network. Of course, the second client device 208(2) may include one or more of any of the devices described herein.

The process may be executed via the communication network(s) 210, which may comprise plural networks as described above. For example, in an exemplary embodiment, either or both of the first client device 208(1) and the second client device 208(2) may communicate with the CDCAT device 202 via broadband or cellular communication. Of course, these embodiments are merely exemplary and are not limiting or exhaustive.

Cyber defense capability assessment tool module 302 may execute a process for implementing a cyber defense capability assessment tool that improves the overall speed, ease, and user experience of cyber defense capability assessment tasks. An exemplary process for implementing a cyber defense capability assessment tool is generally indicated at flowchart 400 in FIG. 4.

In process 400 of FIG. 4, at step S402, cyber defense capability assessment tool module 302 compiles a list of resources in a private computer network and a configuration of the resources. The resource configuration list may include at least one from among: a client, a server, a gateway, a database, an application, an operating system, an IoT device, a router, a network hub, a network switch, a surveillance camera, a surveillance video recorder, a smart card, a biometric authentication device, an electronic lock, and an access control system. However, the resource configuration list may include any device, software and/or firmware that is present on the computer network. The input for the network resource configuration list may be provided manually by one or more individuals, retrieved from memory, received from a communication network (such as, the Internet or network 122/210), obtained from a source of real-time data, and/or generated by any other input source. A user may use a device such as client device 208(1) or client device 208(2) to provide the input for the network resource configuration list, and the input for the network resource configuration list may also or alternatively be gathered through data mining. Moreover, the network resource configuration list may be obtained from a database or repository such as network configurations database 206(1).

At step S404, cyber defense capability assessment tool module 302 compiles a list of cyber defense mechanisms available in a private computer network and a configuration of the mechanisms. The network cyber defense configuration list may include at least one from among: an antivirus service, a malware scanner, a spam filter, a firewall, an access control mechanism, sandboxing software, an encryption mechanism, an intrusion detection system (IDS), a denial-of-service (DoS) attack monitoring system, and best practices for security. However, the network cyber defense configuration list may include security mechanisms of any form, such as security guards, security checks, etc. As with the resource configuration list, the input for the network cyber defense configuration list may be similarly provided manually by one or more individuals, retrieved from memory, received from a communication network (such as, the Internet or network 122/210), obtained from a source of real-time data, and/or generated by any other input source. A user may use a device such as client device 208(1) or client device 208(2) to provide the input for the network cyber defense configuration list, and the input for the network cyber defense configuration list may also or alternatively be gathered through data mining. Moreover, the network cyber defense configuration list may be obtained from a database or repository such as network configurations database 206(1).

At step S406, cyber defense capability assessment tool module 302 utilizes the network resource configuration list and the network cyber defense configuration list, to train an artificial intelligence and machine learning (AI/ML) model. At step S406, the training of the AI/ML model may include utilizing the network resource configuration list and the network cyber defense configuration list, to initialize the AI/ML model. Cyber defense capability assessment tool module 302 may update network configurations database 206(1) to store the network resource configuration list and the network cyber defense configuration list.

At step S408, cyber defense capability assessment tool module 302 utilizes the AI/ML model to identify applicable threats and vulnerabilities. The applicable threats and vulnerabilities may be identified from a curated repository of network threats and network vulnerabilities. The curated repository is a knowledge base and model for the behavior of cyber adversaries, and the curated repository reflects the various phases of an adversary's attack lifecycle and the platforms they are known to target.

The curated repository may be a network threat and vulnerability data repository, such as network threat and vulnerability data repository 206(2). Network threat and vulnerability data repository 206(2) may be a threat intelligence repository of an organization's Security Information and Event Management (SIEM) or log management tool. However, network threat and vulnerability data repository 206(2) may also be a threat intelligence repository of a source that is external to an organization's network. For example, network threat and vulnerability data repository 206(2) may include at least one from among: a Cyber Kill Chain framework; a MITRE Adversarial Tactics, Techniques, and Common Knowledge (ATT&CK) framework; or any other threat intelligence knowledge base.

At step S410, cyber defense capability assessment tool module 302 utilizes the AI/ML model to evaluate the applicable threats and vulnerabilities against the network configuration lists. The applicable threats and vulnerabilities are evaluated against the network configuration lists to determine whether any of the applicable threats and vulnerabilities are actually a threat to, or a vulnerability of, the network, which may be a private network to which CDCAT device 202 belongs. For example, the private network to which CDCAT device 202 belongs may be a communication network, such as communication network 210. An applicable threat or vulnerability that is actually a threat to, or a vulnerability of, a particular network, is any applicable threat or vulnerability that is actually a threat to, or vulnerability of, one or more particular resources or configurations of the particular network.

At step S410, cyber defense capability assessment tool module 302 utilizes the AI/ML model to determine threats and vulnerabilities by evaluating the applicable threats and vulnerabilities against the network configuration lists. More particularly, to determine the threats and vulnerabilities, the AI/ML model may evaluate the applicable threats and vulnerabilities to determine whether any of them are actually a threat to, or a vulnerability of, one or more resources or configurations of the network, which may be a private network to which CDCAT device 202 belongs.

At step S412, cyber defense capability assessment tool module 302 utilizes the AI/ML model to determine how the threats and vulnerabilities apply to the network's cyber defense configuration. Cyber defense capability assessment tool module 302 determines how the threats and vulnerabilities apply to the network's cyber defense configuration by having the AI/ML model evaluate the threats and vulnerabilities against the network cyber defense configuration list. The evaluation of the threats and vulnerabilities against the network cyber defense configuration list may determine whether any of the threats and vulnerabilities is not being addressed by the network's cyber defense configuration. The evaluation may also determine how any threat or vulnerability that is not being addressed by the network's cyber defense configuration, actually threatens the network or renders the network vulnerable.

At step S414, cyber defense capability assessment tool module 302 utilizes the AI/ML model to recommend network configuration changes that address any of the threats and vulnerabilities that apply to the network. For example, the AI/ML model's evaluation of the threats and vulnerabilities against the network cyber defense configuration list, may indicate that there are threats and vulnerabilities that are not being addressed by either a configuration of the network's resources or the network's cyber defense configuration. The AI/ML model's evaluation may further indicate that one or more changes to a configuration of the network will address one or more of the threats and vulnerabilities that are not being addressed by either a configuration of the network's resources or the network's cyber defense configuration. To address the one or more of the threats and vulnerabilities that are not being addressed by either a configuration of the network's resources or the network's cyber defense configuration, cyber defense capability assessment tool module 302 may recommend that the one or more changes be made to a configuration of the network.

The results of the evaluation and these recommendations may be sent, as a visual indication, to at least one individual, such as an assessment team or some other team.

At step S416, cyber defense capability assessment tool module 302 implements network configuration changes. The network configuration changes may be the one or more recommended changes to a configuration of the network. However, the network configuration changes may also, or alternatively, be one or more changes that are recommended by a network cyber defense specialist/professional. The network configuration changes may be one or more changes to a network configuration, that addresses one or more of the threats and vulnerabilities that are not being addressed by a configuration of the network. The implementation of the network configuration changes may require an update to the network resource configuration list, the network cyber defense configuration list, or both. In response to the implementation of the network configuration changes, cyber defense capability assessment tool module 302 may automatically update the network resource configuration list, the network cyber defense configuration list, or both.

At step S418, the Cyber defense capability assessment tool module 302 receives feedback on the implemented network configuration changes. The feedback on the implemented network configuration changes may be received from one or more individuals, retrieved from memory, received from a communication network (such as, the Internet or network 122/210), obtained from a source of real-time data, and/or generated by any other input source. For example, a user (such as a network cyber defense specialist/professional) may use a device such as client device 208(1) or client device 208(2) to provide the feedback, and that feedback may also or alternatively be gathered through data mining.

The feedback may comprise a determination of whether the implemented network configuration changes actually addresses any of the one or more of the threats and vulnerabilities that were not being addressed by a configuration of the network. The feedback may comprise a determination of whether the implementation of the network configuration changes eliminates any of the threats and vulnerabilities that were not being addressed by a configuration of the network. In addition, the feedback may also or alternatively comprise a determination of whether any of the threats and vulnerabilities that were not being addressed by a configuration of the network, continue to be a threat to or a vulnerability of the network (e.g., the network to which CDCAT device 202 belongs) after the network configuration changes are implemented. Moreover, the feedback may comprise an indication of how implementing the network configuration changes actually affects the threats and vulnerabilities that were not being addressed by a configuration of the network.

At step S420, the Cyber defense capability assessment tool module 302 may utilize the feedback to update the AI/ML model. In other words, the feedback may be used as training data for updating the AI/ML model according to the results of the network configuration changes. For example, the feedback may be used to update the AI/ML model so that the updated AI/ML model includes one or more indications of how implementing the network configuration changes, actually affects the threats and vulnerabilities that were not being addressed by a configuration of the network before the network configuration changes were implemented.

After step S420, process 400 may return to step S402 or step S404 to record any changes to the network. For example, after step S420, either or both of the network resource configuration and the network cyber defense configuration may be changed, and the change may be reflected by either or both of the network resource configuration list and the network cyber defense configuration list. In addition, after step S420, may return to step S408 to re-evaluate the network against applicable threats and vulnerabilities. This re-evaluation of the network may be performed periodically, continuously, and/or indefinitely. Additionally or alternatively, this re-evaluation of the network may be performed by at least one individual, such as an assessment team or some other team.

Figure 5:
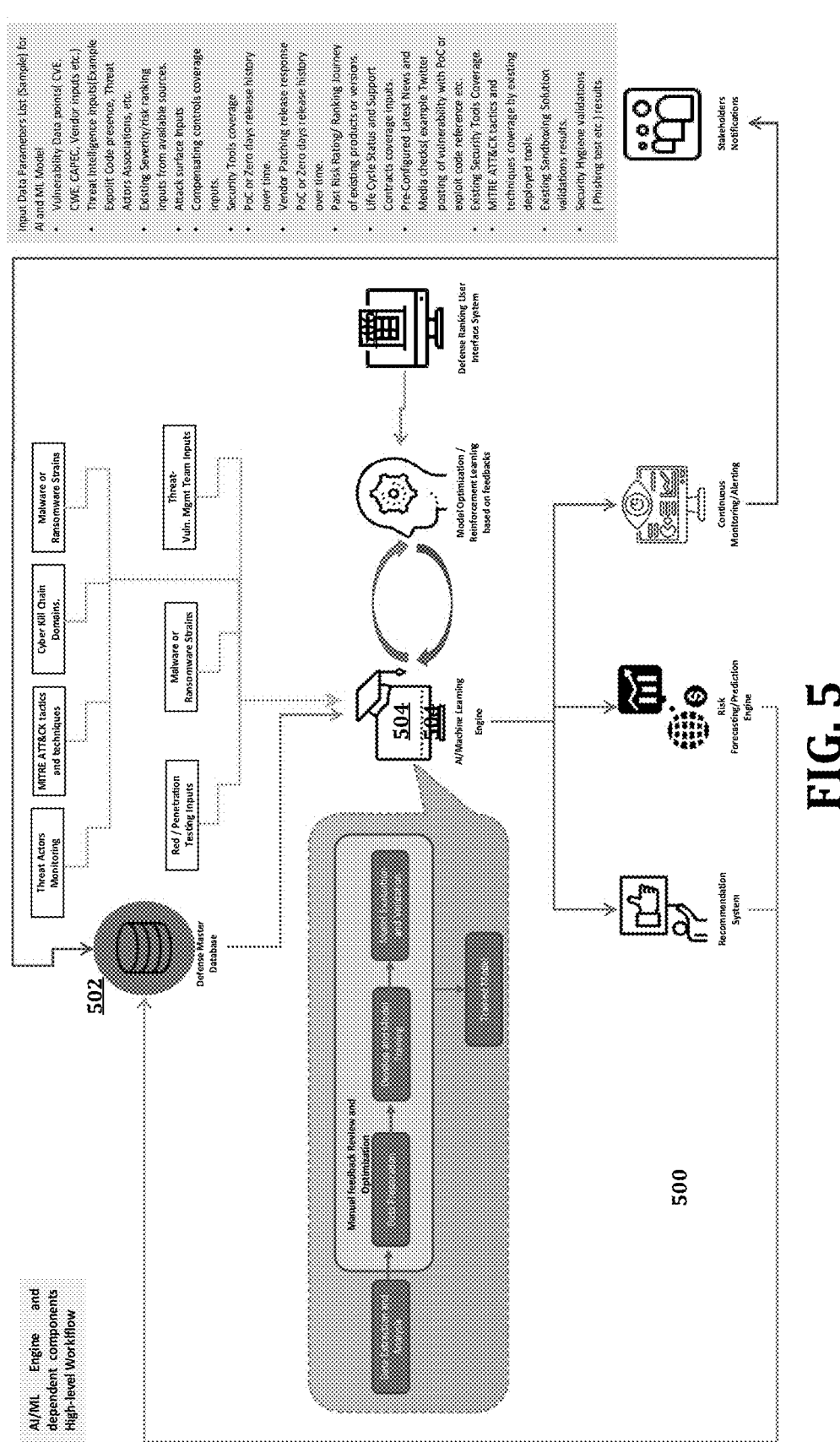
FIG. 5 is an exemplary system for applying a cyber defense capability assessment service.

An exemplary system for implementing a Cyber defense capability assessment tool is generally indicated at an exemplary computer network environment 500 in FIG. 5.

The exemplary computer network environment 500 that is depicted in FIG. 5 includes defense master database 502, artificial intelligence/machine learning (AI/ML) engine 504, and defense ranking user interface system 506.

Defense master database 502 is a database that stores information about a system's cyber defenses. For example, defense master database 502 includes at least one from among: information output by a risk forecasting or prediction engine of the system (e.g., AI/ML engine 504) and/or a recommendation system; and information output by a subsystem that provides alerts and continuously monitors the system's cyber defenses. In addition, defense master database 502 may also include the network resource configuration list, the network cyber defense configuration list, or both. An output of defense master database 502 is an input to AI/ML engine 504.

In exemplary computer network environment 500, AI/ML engine 504 is the developed through manual feedback review and optimization. More particularly, AI/ML engine 504 is produced by subjecting a data extraction and analysis, to manual feedback review and optimization, in order to produce a trained AI/ML model. The trained AI/ML model is utilized by AI/ML engine 504 to perform at least one from among: providing recommendations; forecasting or predicting network cyber defense risks; and alerting or continuously monitoring a system's cyber defenses.

In exemplary computer network environment 500, to produce the trained AI/ML model, after being analyzed, extracted data is prepared to be used as training data for an AIML model. After the extracted data is analyzed then prepared for use as training data, this prepared data is utilized to develop and to train the AI/ML model. Once the AI/ML model has been developed and trained, the AI/ML model is then evaluated and validated to ensure that the AI/ML model has been fully developed and trained. In response to the evaluation and validation, the AI/ML model may be further developed and trained, after which the AIML model may then be re-evaluated and re-validated. The re-evaluation and re-validation of the AI/ML model may be performed by at least one individual, such as an assessment team or some other team. The steps of further developing and training the AI/ML model, followed by re-evaluating and re-validating the AI/ML model, may be repeated in tandem periodically or continuously until an evaluation and validation of the AI/ML model's indicates that the AI/ML model has been optimized. The AI/ML model can be considered to be optimized when the AI/ML model is fully developed and trained.

In addition to the manual feedback review and optimization, the AI/ML model is also optimized by incorporating into the AI/ML model, feedback from defense ranking user interface system 506. The feedback from defense ranking user interface system 506 is incorporated into the AI/ML model through reinforcement learning or any other form of model optimization.

In exemplary computer network environment 500, AI/ML engine 504 has a plurality of inputs. More particularly, in addition to defense master database 502, the input to AI/ML engine 504 may also include the output of one or more knowledge bases of one or more of the following cyber threat intelligence information: threat actors monitoring; MITRE ATT&CK tactics and techniques; Cyber Kill Chain domains; malware or ransomware strains; red or penetration testing inputs; and threat-vulnerability management team inputs.

For example, as depicted in FIG. 5, input data parameters list (sample) for AI and ML model may include: vulnerability data points (CVE, CWE, CAPEC, vendor inputs, etc.); threat intelligence inputs (e.g., Exploit Code presence, Threat Actors Associations, etc.); existing severity/risk ranking inputs from available sources; attack surface inputs; compensating controls coverage inputs; security tools coverage; PoC or zero days release history over time; vendor patching release response PoC or zero days release history over time; past risk rating/ranking journey of existing products or versions; life cycle status and support contracts coverage inputs; pre-configured latest news and media checks (e.g., Twitter posting of vulnerability with PoC or exploit code reference, etc.); existing security tools coverage; MITRE ATT&CK tactics and techniques coverage by existing deployed tools; existing sandboxing solution validations results; and security hygiene validations (phishing tests, etc.) results.

In exemplary computer network environment 500, AI/ML engine 504 has a plurality of outputs. More particularly, AI/ML engine 504 includes an output of: a recommendation system; a risk forecasting and/or prediction engine; and a system for continuous monitoring and/or alerting. The outputs of AI/ML engine 504 are utilized as inputs to defense master database 502. By utilizing the outputs of AI/ML engine 504 as inputs to defense master database 502, defense master database 502 may be kept up to date regarding its system's cyber defenses. The output of the continuous monitoring and/or alerting is also utilized to provide notifications to stakeholders. The notifications may be provided in the form of one or more from among: an SMS message, an e-mail message, an instant message, a direct message, a pop-up message, or any other type of message that conveys information to a user. The stakeholders may include any user of the system of exemplary computer network environment 500. For example, a stakeholder may be a network cyber defense specialist/professional.

In exemplary computer network environment 500, defense ranking user interface system 506 ranks the system's network cyber defenses. In addition, defense ranking user interface system 506 also provides system users with a means for providing feedback to the AI/ML engine 504.

Accordingly, with this technology, a system for implementing a service that simplifies an understanding of a computer network's cyber defense capabilities, such as exemplary computer network environment 500, which may include one or more databases, such as defense master database 502. Although exemplary computer network environment 500 depicts a system that has been disclosed as being distinct from system 300, it should be noted that these two distinct systems may be used in combination.

Accordingly, the technological solution disclosed herein simplifies an understanding of a computer network's cyber defense capabilities and, thereby, reduces the time that it takes to evaluate such cyber defense capabilities as well as the cost of such evaluations. The technology disclosed herein improves existing technology in the field of the herein disclosed invention, by automating cyber defense capability assessments. This technological solution also improves on existing technology because its automated cyber defense capability assessments tend to eliminate manual errors.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for implementing a service that simplifies network cyber defense capabilities, the method comprising:

utilizing at least one real-time data source to obtain resources of a private computer network and configurations of the resources;

compiling, by the processor, a cyber defense list of cyber defense mechanisms that exist within the private computer network, wherein the compiling the cyber defense list of cyber defense mechanisms comprises mining the private computer network to compile the cyber defense list which comprises a cyber defense configuration of the cyber defense mechanisms;

utilizing, by the processor, an artificial intelligence and machine learning (AI/ML) engine to evaluate the resources of the private computer network, the configurations of the resources, and the cyber defense mechanisms, against a set of at least one from among threats and vulnerabilities, to determine whether the set of the at least one from among threats and vulnerabilities comprises at least one from among an applicable threat and an applicable vulnerability, wherein the AI/ML engine evaluates by evaluating tests that comprise at least one phishing test, wherein the at least one from among the applicable threat and the applicable vulnerability comprises at least one from among: a threat to at least one from among the resources and the configurations of the resources; and a vulnerability of at least one from among the resources and the configurations of the resources, and wherein the AI/ML engine comprises a recommendation system, a risk forecasting engine, and a monitoring system;

generating, by the processor, a visual indication of whether the set of the at least one from among threats and vulnerabilities comprises the at least one from among the applicable threat and the applicable vulnerability that threatens a security of the private computer network, wherein the visual indication comprises a defense ranking parameter that summarizes an overall performance of the cyber defense mechanisms with respect to the at least one from among the applicable threat and the applicable vulnerability; and when, as a result of the evaluating, a determination is made that the set of the at least one from among threats and vulnerabilities comprises the at least one from among the applicable threat and the applicable vulnerability:

recommending at least one network configuration change that addresses whether the at least one from among the applicable threat and the applicable vulnerability threatens the security of the private computer network;

implementing the at least one network configuration change;

continuously monitoring the private computer network to obtain, from the at least one real-time data source, feedback about the implementing the at least one network configuration change, wherein the continuously monitoring the private computer network to obtain the feedback comprises obtaining at least a portion of the feedback by mining the private computer network, and wherein the feedback comprises a feedback indication of how the implementing the at least one network configuration change affects whether the at least one from among the applicable threat and the applicable vulnerability threatens the security of the private computer network; and updating, according to the feedback, an AI/ML model of the AI/ML engine.

2. The method of claim 1, wherein the visual indication is provided to at least one individual for analysis, and wherein the visual indication comprises an illustration of the private computer network, and wherein the illustration depicts a performance of at least one of the cyber defense mechanisms with respect to the at least one from among the applicable threat and the applicable vulnerability.

3. The method of claim 1, wherein:

the resources comprise at least one from among: a client, a server, a gateway, a database, an application, an operating system, an IoT device, a router, a network hub, a network switch, a surveillance camera, a surveillance video recorder, a smart card, a biometric authentication device, an electronic lock, and an access control system; and the cyber defense mechanisms comprise at least one from among: an antivirus service, a malware scanner, a spam filter, a firewall, an access control mechanism, sandboxing software, an encryption mechanism, an intrusion detection system (IDS), a denial-of-service (DoS) attack monitoring system, and best practices for security.

4. The method of claim 1, wherein the processor utilizes a curated repository to identify the set of the at least one from among threats and vulnerabilities.

5. The method of claim 4, wherein the curated repository comprises at least one from among: a Cyber Kill Chain framework; and an Adversarial Tactics, Techniques, and Common Knowledge (ATT&CK) framework.

6. The method of claim 1, wherein the utilizing comprises utilizing the AI/ML engine to predict whether there is a risk to which the private computer network will be susceptible.

7. The method of claim 6, wherein the utilizing comprises utilizing the AI/ML engine to:

receive training data, wherein the training data comprises at least one from among the configurations of the resources, the cyber defense configuration, and feedback about the private computer network;

train, according to the training data, an AI/ML model of the AI/ML engine; and utilize the AI/ML model to determine whether the at least one from among the applicable threat and the applicable vulnerability threatens the security of the private computer network.

8. The method of claim 1, further comprising:

producing updated resource configurations by updating the configurations of the resources according to the at least one network configuration change; and periodically re-evaluating, according to the updated resource configurations, the resources of the private computer network against the set of the at least one from among threats and vulnerabilities.

9. A system for implementing a service that simplifies network cyber defense capabilities, the system comprising:

a processor; and memory storing instructions that, when executed by the processor, cause the processor to:

utilize at least one real-time data source to obtain resources of a private computer network and configurations of the resources;

compile a cyber defense list of cyber defense mechanisms that exist within the private computer network, wherein the compiling the cyber defense list of cyber defense mechanisms comprises mining the private computer network to compile the cyber defense list which comprises a cyber defense configuration of the cyber defense mechanisms;

utilize an artificial intelligence and machine learning (AI/ML) engine to evaluate the resources of the private computer network, the configurations of the resources, and the cyber defense mechanisms, against a set of at least one from among threats and vulnerabilities, to determine whether the set of the at least one from among threats and vulnerabilities comprises at least one from among a threat and a vulnerability, wherein the AI/ML engine evaluates by evaluating tests that comprise at least one phishing test, wherein the at least one from among the threat and the vulnerability comprises at least one from among: a threat to at least one from among the resources and the configurations of the resources; and a vulnerability of at least one from among the resources and the configurations of the resources, and wherein the AI/ML engine comprises a recommendation system, a risk forecasting engine, and a monitoring system;

generate a visual indication of whether the set of the at least one from among threats and vulnerabilities comprises the at least one from among the threat and the vulnerability threatens a security of the private computer network, wherein the visual indication comprises a defense ranking parameter that summarizes an overall performance of the cyber defense mechanisms with respect to the at least one from among the applicable threat and the applicable vulnerability; and when, as a result of the evaluating, a determination is made that the set of the at least one from among threats and vulnerabilities comprises the at least one from among the applicable threat and the applicable vulnerability:

recommend at least one network configuration change that addresses whether the at least one from among the applicable threat and the applicable vulnerability threatens the security of the private computer network;

implement the at least one network configuration change;

continuously monitor the private computer network to obtain, from the at least one real-time data source, feedback about the implementing the at least one network configuration change, wherein the continuously monitoring the private computer network to obtain the feedback comprises obtaining at least a portion of the feedback by mining the private computer network, and wherein the feedback comprises a feedback indication of how the implementing the at least one network configuration change affects whether the at least one from among the applicable threat and the applicable vulnerability threatens the security of the private computer network; and update, according to the feedback, an AI/ML model of the AI/ML engine.

10. The system of claim 9, wherein the visual indication is provided to at least one individual for analysis, and wherein the visual indication comprises:

an illustration of the private computer network, wherein the illustration depicts a performance of at least one of the cyber defense mechanisms with respect to the at least one from among the applicable threat and the applicable vulnerability.

11. The system of claim 9, wherein:

the resources comprise at least one from among a client, a server, a gateway, a database, an application, an operating system, an IoT device, a router, a network hub, a network switch, a surveillance camera, a surveillance video recorder, a smart card, a biometric authentication device, an electronic lock, and an access control system; and the cyber defense mechanisms comprise at least one from among an antivirus service, a malware scanner, a spam filter, a firewall, an access control mechanism, sandboxing software, an encryption mechanism, an intrusion detection system (IDS), a denial-of-service (DoS) attack monitoring system, and best practices for security.

12. The system of claim 9, wherein the instructions, when executed by the processor, further cause the processor to:

utilize a curated repository to identify the set of the at least one from among threats and vulnerabilities, wherein the curated repository comprises at least one from among: a Cyber Kill Chain framework; and an Adversarial Tactics, Techniques, and Common Knowledge (ATT&CK) framework.

13. The system of claim 9, wherein the utilizing comprises utilizing the AI/ML engine to predict whether there is a risk to which the private computer network will be susceptible.

14. The system of claim 13, wherein the utilizing comprises utilizing the AI/ML engine to:

receive training data, wherein the training data comprises at least one from among the configurations of the resources, the cyber defense configuration, and feedback about the private computer network;

train, according to the training data, an AI/ML model of the AI/ML engine; and utilize the AI/ML model to determine whether the at least one from among the applicable threat and the applicable vulnerability threatens the security of the private computer network.

15. A non-transitory computer-readable medium storing instructions for implementing a service that simplifies network cyber defense capabilities, wherein the instructions, when executed by a processor, cause the processor to:

utilize at least one real-time data source to obtain resources of a private computer network and configurations of the resources;

compile a cyber defense list of cyber defense mechanisms that exist within the private computer network, wherein the compiling the cyber defense list of cyber defense mechanisms comprises mining the private computer network to compile the cyber defense list which comprises a cyber defense configuration of the private cyber defense mechanisms;

utilize an artificial intelligence and machine learning (AI/ML) engine to evaluate the resources of the private computer network, the configurations of the resources, and the cyber defense mechanisms, against a set of at least one from among threats and vulnerabilities, to determine whether the set of the at least one from among threats and vulnerabilities comprises at least one from among a threat and a vulnerability, wherein the AI/ML engine evaluates by evaluating tests that comprise at least one phishing test, wherein the at least one from among the threat and the vulnerability comprises at least one from among: a threat to at least one from among the resources and the configurations of the resources; and a vulnerability of at least one from among the resources and the configurations of the resources, and wherein the AI/ML engine comprises a recommendation system, a risk forecasting engine, and a monitoring system;

generate a visual indication of whether the set of the at least one from among threats and vulnerabilities comprises the at least one from among the threat and the vulnerability threatens a security of the private computer network, wherein the visual indication comprises a defense ranking parameter that summarizes an overall performance of the cyber defense mechanisms with respect to the at least one from among the applicable threat and the applicable vulnerability; and when, as a result of the evaluating, a determination is made that the set of the at least one from among threats and vulnerabilities comprises the at least one from among the applicable threat and the applicable vulnerability:

recommend at least one network configuration change that addresses whether the at least one from among the applicable threat and the applicable vulnerability threatens the security of the private computer network;

implement the at least one network configuration change;

continuously monitor the private computer network to obtain, from the at least one real-time data source, feedback about the implementing the at least one network configuration change, wherein the continuously monitoring the private computer network to obtain the feedback comprises obtaining at least a portion of the feedback by mining the private computer network, and wherein the feedback comprises a feedback indication of how the implementing the at least one network configuration change affects whether the at least one from among the applicable threat and the applicable vulnerability threatens the security of the private computer network; and update, according to the feedback, an AI/ML model of the AI/ML engine.

16. The non-transitory computer-readable medium of claim 15, wherein the visual indication is provided to at least one individual for analysis, and wherein the visual indication comprises:

a defense ranking parameter that summarizes an overall performance of the cyber defense mechanisms with respect to the at least one from among the applicable threat and the applicable vulnerability; and an illustration of the private computer network, wherein the illustration depicts a performance of at least one of the cyber defense mechanisms with respect to the at least one from among the applicable threat and the applicable vulnerability.

* * * * *